C. M. HUSTED.
PROCESS FOR TREATING FULLER'S EARTH AND SIMILAR MATERIALS.
APPLICATION FILED JUNE 25, 1915.
1,256,233.
Patented Feb. 12, 1918.
4 SHEETS—SHEET 3.
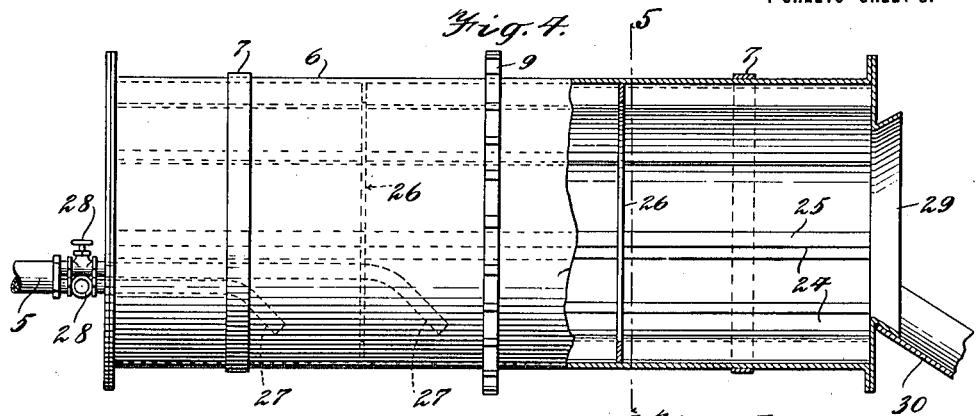
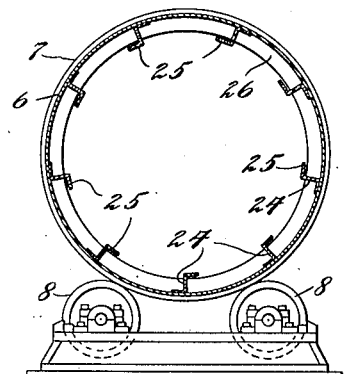
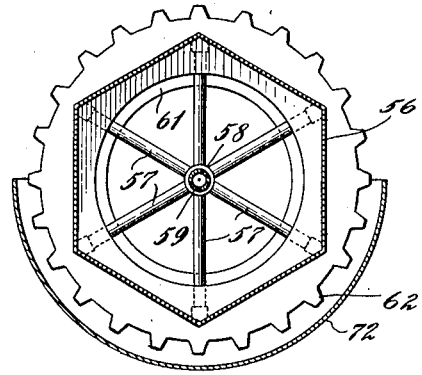
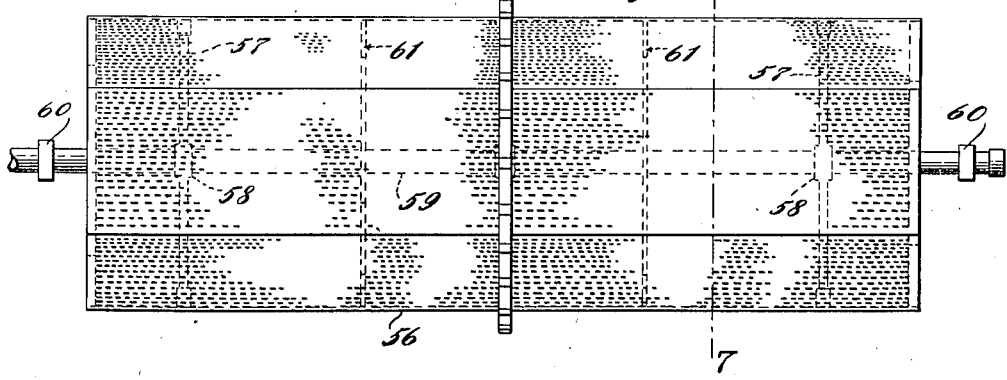

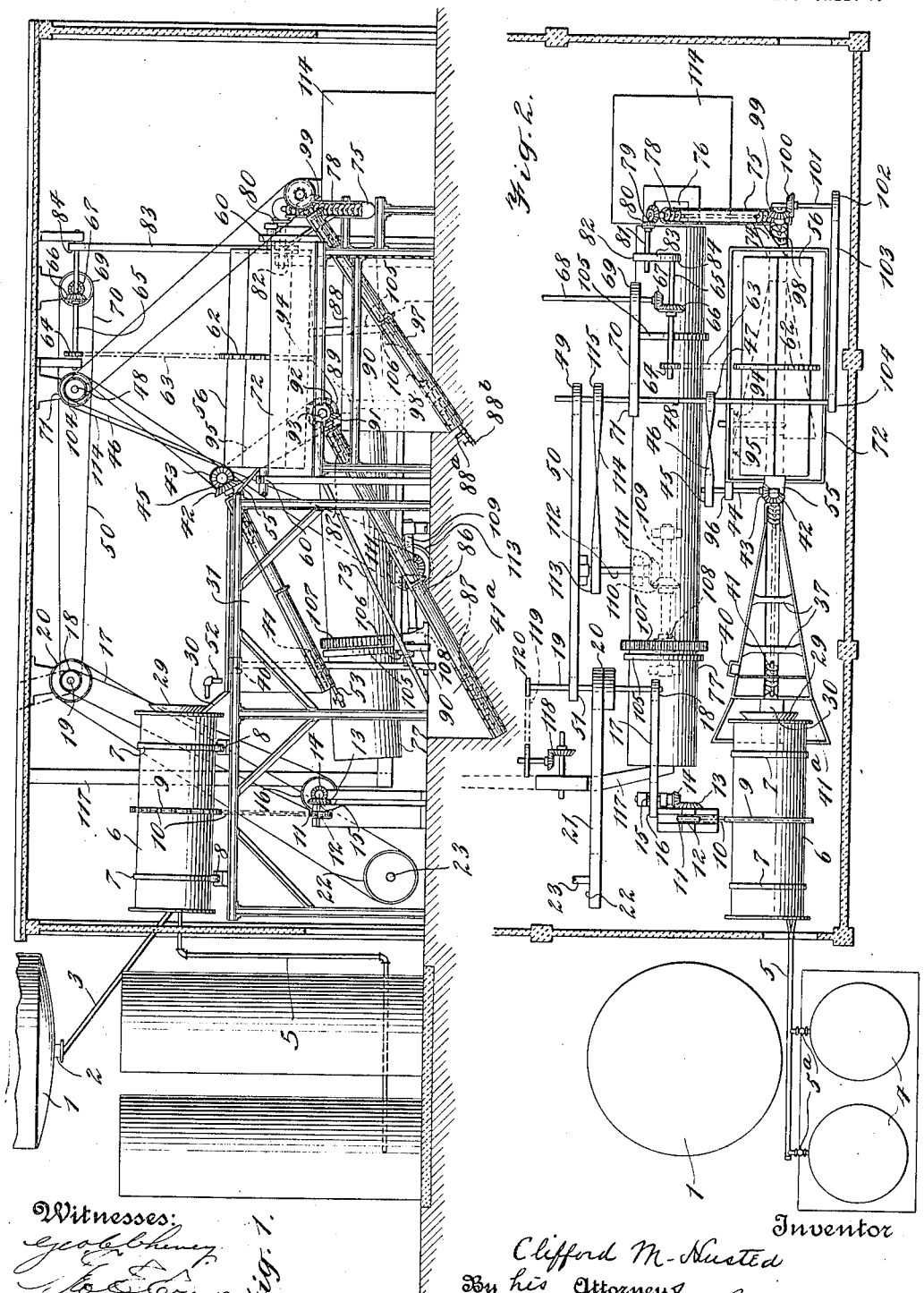

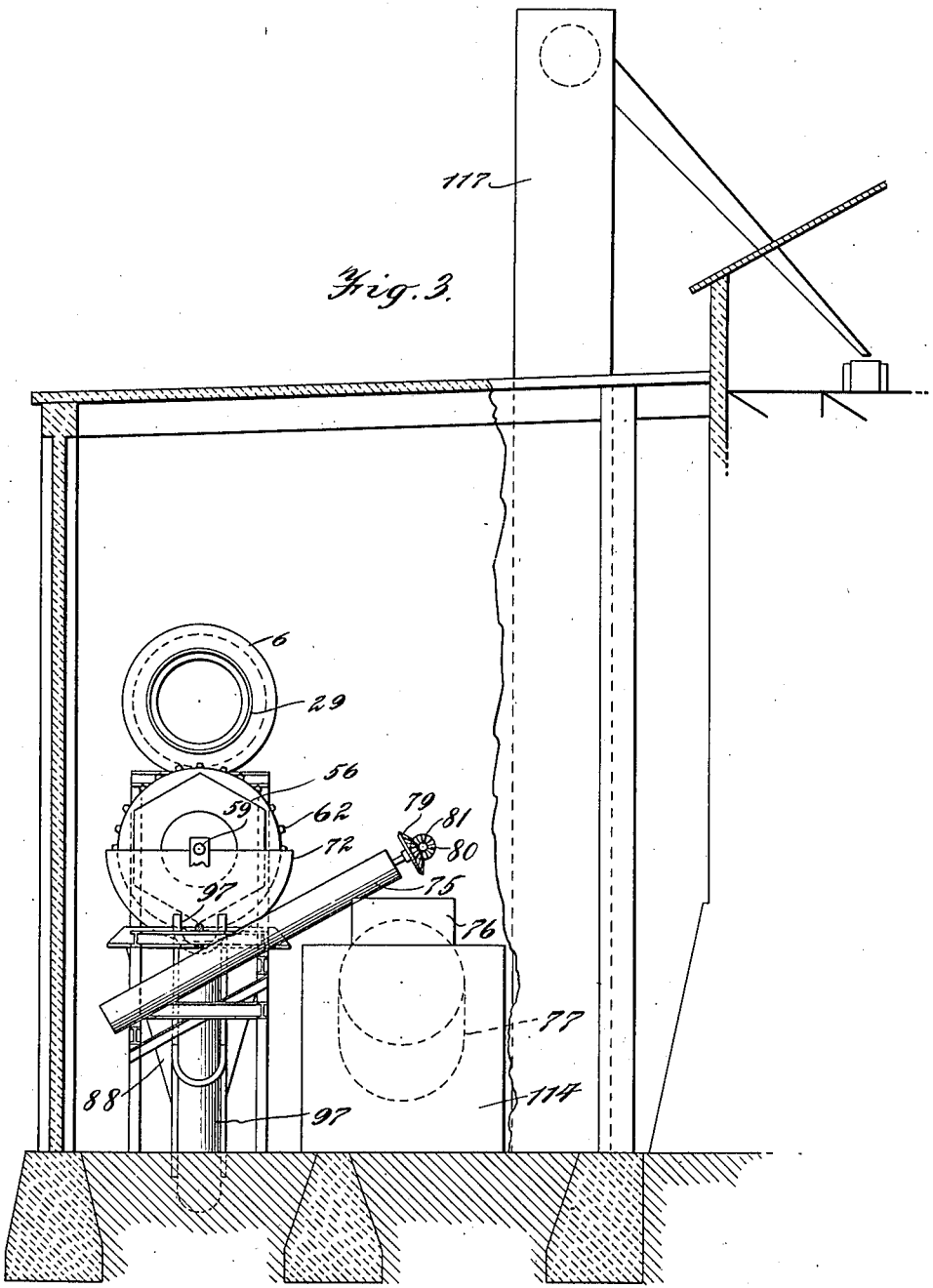

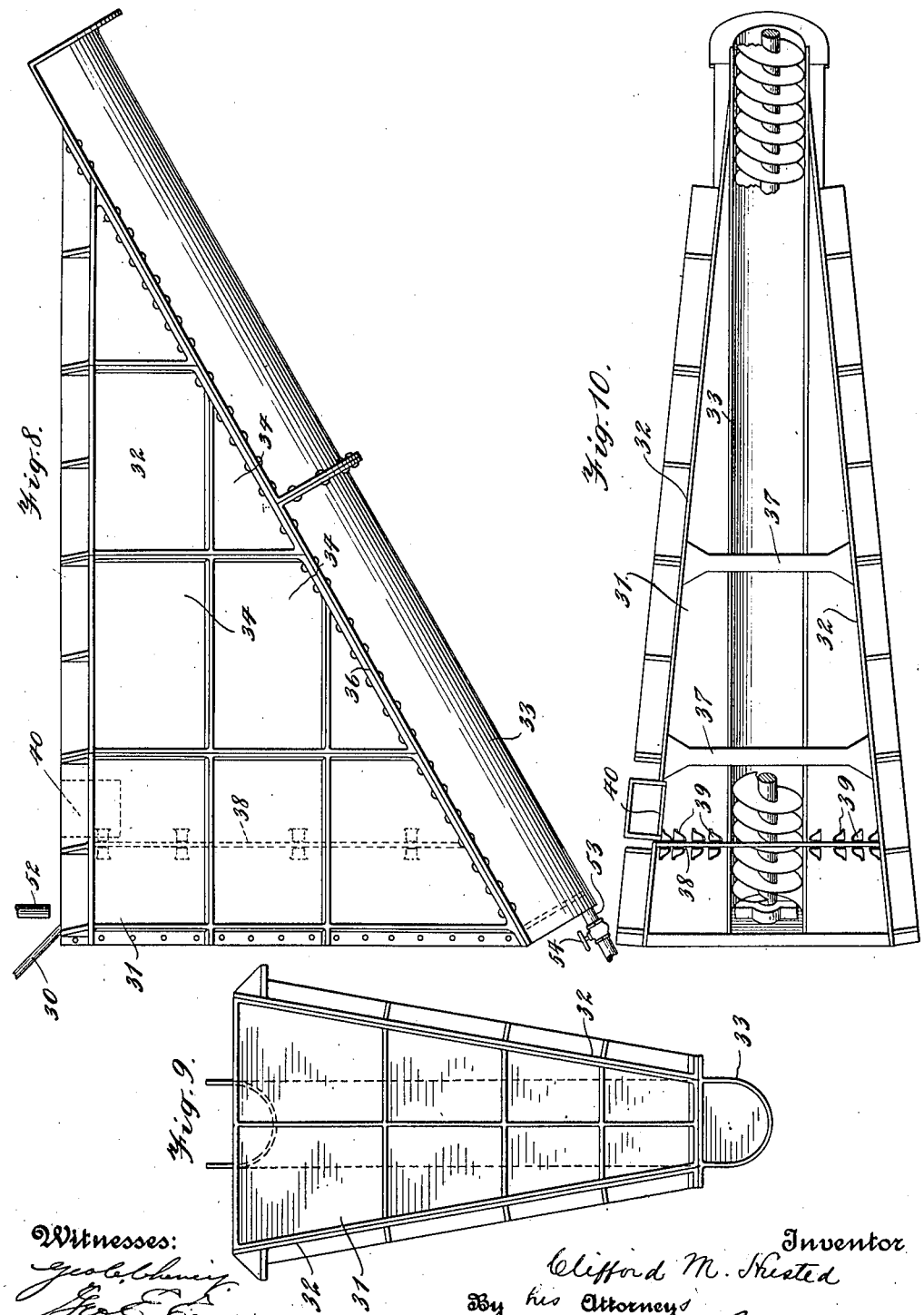

UNITED STATES PATENT OFFICE.

CLIFFORD M. HUSTED, OF JERSEY CITY, NEW JERSEY, ASSIGNOR TO STANDARD OIL COMPANY, A CORPORATION OF NEW JERSEY.

PROCESS FOR TREATING FULLERS' EARTH AND SIMILAR MATERIALS.

1,256,233.                Specification of Letters Patent.    Patented Feb. 12, 1918.

Application filed June 25, 1915. Serial No. 36,189.

*To all whom it may concern:*

Be it known that I, CLIFFORD M. HUSTED, a citizen of the United States, residing at Jersey City, county of Hudson, and State of New Jersey, have invented certain new and useful Improvements in Processes for Treating Fullers' Earth and Similar Materials, of which the following is a specification.

My invention relates to new and useful improvements in processes for treating fullers' earth and similar filtering materials, and more particularly to the treatment of fullers' earth which has been used for the purpose of filtering or treating hydrocarbon oils in order to remove impurities therefrom and to improve the color of the oils, the object of my present invention being to so treat fullers' earth, after it has been used for oil filtering or treating purposes, as to remove therefrom the impurities which are carried thereby as a result of the filtering or treating operation, or which may be present in the earth, so that the fullers' earth may be repeatedly used for said purposes. The primary object of the invention is not only to purify the fullers' earth, but to provide a treatment for that purpose which may be expeditiously carried out with a saving of time over processes hitherto known. Heretofore fullers' earth which has been used for oil filtering and treating has been purified by the application thereto of sulfuric acid which reacts with the impurities to form sulfates which, with other impurities, are afterward separated from the fullers' earth, but this process has been long and tedious and for that reason objectionable inasmuch as several days are required in order to carry out the treatment, the process generally being to place the fullers' earth in a container or vat into which the sulfuric acid is admitted and permitted to percolate or seep through the body of fullers' earth. Obviously, this acid treatment has required excessive time because of the time it takes for the acid to pass through the body of the earth, and is further objectionable because of the difficulty of having the acid disseminated throughout the entire body of the earth, which resulted in some of the parts thereof escaping treatment. In my invention, to be hereinafter described, I provide a method whereby the acid is quickly and efficiently applied throughout the entire body of the fullers' earth so that said body is completely treated, and also provide steps, whereby the impurities and sulfates are quickly separated from the treated earth, the result being that I am able to more completely and efficiently treat the earth in a much shorter time than has been possible by the steps and means hitherto known. By my invention I am able to thoroughly and completely purify the earth, including washing and drying thereof, in approximately one-half hour.

The invention consists in the method to be more fully described hereinafter, and the novelty of which will be particularly pointed out and distinctly claimed.

In the accompanying drawings, I have fully and clearly illustrated a preferred embodiment of an apparatus for carrying out the process constituting my invention, in which drawings:

Figure 1 is a view in side elevation of an apparatus adapted to carry out the process forming my invention.

Fig. 2 is a plan view of the apparatus shown in Fig. 1.

Fig. 3 is a view in end elevation of the apparatus shown in Figs. 1 and 2 looking from the right of said figures.

Fig. 4 is a view in side elevation with parts broken away, and, partly in section, of means for mixing the acid or treating fluid with the fullers' earth.

Fig. 5 is a section on the line 5—5 of Fig. 4.

Fig. 6 is a view in side elevation of a washing apparatus.

Fig. 7 is a section on the line 7—7 of Fig. 6.

Fig. 8 is a view in side elevation of a separator or settling tank.

Fig. 9 is an end elevation of the structure shown in Fig. 8 and looking from the left of said figure, and Fig. 10 is a top plan view of the structure shown in Figs. 8 and 9.

I will first proceed to describe a form of apparatus for carrying out the method of my invention, and will then describe the method when setting forth the operation of said apparatus.

Referring to the drawings by characters of reference, 1 designates a receptacle to contain a supply of the fullers' earth to be treated, said receptacle being preferably in the form of a tank having an outlet 2, from which leads a spout or chute 3, to feed the earth to the apparatus for purifying the same. 4, 4 designate receptacles preferably in the form of tanks to contain a supply of sulfuric acid with which the fullers' earth is to be treated, said tanks having suitable pipe connection with a supply pipe 5 leading to the purifying apparatus, the flow from each tank 4 being controlled by a suitable valve 5ª. The chute 3 and the pipe 5 lead to an apparatus for thoroughly mixing together the acid and fullers' earth, which apparatus consists of an open ended cylinder 6, arranged at an incline to cause progressive passage of the mixture therethrough, the said chute 3 and pipe 5 opening into the higher end of said cylinder. The cylinder 6 may be caused to revolve by any suitable means, the same being provided with circumferential bands or straps 7 resting upon bearing rollers 8, and having a circumferential sprocket band 9, engaged by a sprocket chain 10 driven from a sprocket wheel 11 on a shaft 12. The shaft 12 carries a bevel-gear 13, meshing with a bevel-gear 14 on a shaft 15, the latter bearing a belt-pulley 16 driven by a belt 17, from a pulley 18 on a shaft 19, the latter carrying a pulley 20 driven by a belt 21, and pulley 22 on a power shaft 23, driven from any suitable source of power, not shown.

In order to provide for the thorough mixing of the acid and fullers' earth, I provide the cylinder or drum 6 with longitudinally extending baffles 24 having lifting flanges 25, directed in the direction of rotation of said drum so as to pick up the material and drop it in the lower portion of the drum and thereby facilitate mixing. I also divide the drum or cylinder into a plurality of zones by means of internally projecting flanges 26, preferably two such flanges being employed dividing the drum into three chambers or zones of equal size.

I prefer to provide the acid supply pipe 5 with two outlet branches 27, discharging in the first and second chambers respectively of the mixing drum, so as to provide for proper distribution of the acid through the body of earth being treated. Each of the discharge branches 27 is preferably provided with a controlling valve 28 for regulating the flow of acid to the drum.

The mixing drum is preferably made of sheet iron, and is lined with lead so as to resist chemical action of the acid thereon. In the commercial embodiment described herein, the drum is approximately twelve feet long and fifty-four inches in diameter, although these dimensions are not obligatory and may be varied without departing from the scope of my invention.

The outlet end of the drum is provided with a flaring discharge spout 29, by which the earth with the acid mixed therewith is discharged into a chute 30 leading to a washing and separating or settling chamber 31, in which the fullers' earth is permitted to settle out of the liquid mass and the impurities, containing some of the earth, are flowed off to a "sump" or collecting vat. This chamber 31 is in the form of a tank or vat having an open top, and composed of side walls 32, which taper toward each other from the inlet end toward the end farthest away from the chute 30, and also inclined toward each other as they approach the bottom of the vat, as is clearly shown in Figs. 8, 9 and 10. The said vat is provided with an inclined gutter shaped bottom 33, which inclines upward from the inlet end of the vat. The vat may be constructed in a number of ways, but I prefer to form the side walls of flanged plates 34 secured together by bolting or welding the flanges to each other, the inclined bottom being in the form of a gutter or trough-like member 33, having longitudinal flanges 36, to which the flanges on the lowermost edges of the side walls are bolted. The bottom may be made of one or more pieces, two being employed in the embodiment illustrated. The side walls of the settling tank may be connected and braced by transverse struts or ties 37, and I preferably provide the inlet end with a baffle or partition 38, extending from a point adjacent the top of the vat to a point short of the bottom thereof, said baffle being held in place detachably by spaced guide lugs 39 on the inner faces of the side walls.

In one side wall the vat is provided with an overflow 40, from which leads a pipe to a "sump" 41ª, the arrangement being such that the heavier fullers' earth gravitates to the bottom of the vat, while the fluid bearing the impurities and some fullers' earth escapes through the overflow and passes to the "sump" in which it is permitted to remain to cause the earth to settle out of it and be removed in a manner and for a purpose to be presently described.

The earth which settles to the bottom of the vat or chamber 31 is removed by means of a conveyer screw 41 extending longitudinally of the inclined bottom 33, and adapted to be rotated to convey the material up the inclined bottom to discharge it into a washing apparatus to be presently described. The screw 41 may be driven by any suitable means, as for example, it may be provided with a beveled gear 42 at its upper end, which gear 42 meshes with a beveled gear 43 on a shaft 44, mounted in suitable bearings and carrying at one end a belt-pulley 45, driven by a belt 46 from a pulley 47 on a shaft 48 running parallel to said shaft 44. The shaft 48 carries a belt-pulley 49, driven by a belt 50, passing over a driving pulley 51 on the shaft 19, heretofore described.

The tank 31 is provided continuously with water from a supply pipe 52 discharging into the deeper portion of said tank, i. e., at the end where the clay and acid are discharged into the same. This water when mixing with the clay forms a heavy foam which consists chiefly of sulfates, which foam and water, and some earth, flow to the "sump." This important function of the vat 31 is to separate the sulfates from the earth, and at the same time dilute the acid remaining in the clay. The deeper portion of the vat may be provided with a drain pipe 53 having a controlling valve 54.

The screw 41, heretofore described, raises the settled earth from the bottom of the tank 31 and discharges it into a chute 55, which discharges into a washing drum or cylinder 56, preferably hexagonal in form and the walls of which are made of perforated sheet metal. This washing drum is open-ended, as shown, and is arranged with its axis of revolution on a slight incline so that the material fed down the chute 55 into the higher end thereof, will be fed toward the lower end thereof. The drum 56, is provided with spokes or spiders 57, connected to hubs 58, which are fixed to a hollow perforated pipe 59, extending laterally through the drum longitudinally thereof. This pipe 59 is mounted in suitable bearings 60, so as to serve as a support for the shell, and one end of said pipe is connected to suitable water source, so that water will flow into the pipe and out through the perforations therein, and thoroughly wash the earth fed into said drum. In this drum the clay or earth is thoroughly washed, and the impurities and acid separate therefrom and pass out through the perforated sides of the drum.

The drum 56 is divided into three divisions by means of inwardly projecting flanges or baffles 61, the purpose being to retard the flow of the clay or earth toward the lower outlet end of the drum so as to keep it from passing through the drum too rapidly. The perforations in the pipe 59 only extend through that portion of said pipe, which extends through the upper and intermediate sections of the drum formed by the baffles 61, the purpose being to have the last or lower chamber of the drum act as a draining chamber so as to remove an excess of water from the clay or earth, which will facilitate the drying operation, to be presently described. The drum 56 may be revolved by any suitable means, for instance, it may be provided with a sprocket flange 62 at a point intermediate its ends, about which passes a sprocket chain 63, said sprocket chain passing over a sprocket 64 on a shaft 65, the latter carrying a beveled gear 66 meshing with a beveled gear 67 on a drive shaft 68. On the shaft 68 is a belt-pulley 69, which is driven by a belt 70 from a pulley 71 on the shaft 48, heretofore described.

In the treatment of the earth in the drum 56, a certain amount of the fine earth passes through the perforations in the drum, but this earth is caught by a trough 72 arranged beneath the said drum. The trough 72 is inclined in the opposite direction from the inclination of the drum 56, and at its lower end portion beneath the inlet to said drum 56, discharges into a trough or chute 73, the lower end of which connects with the "sump" or catch basin, heretofore described.

The outlet end of the drum 56 empties into a spout 74, which in turn discharges into one end of a trough 75, the opposite end of which empties into the inlet hopper 76 of a revoluble drying cylinder 77, the construction and operation of which will be presently described. The trough 75 is provided with a longitudinally extending conveyer screw 78, by means of which the earth is fed lengthwise of said trough into the receiving hopper 76. The screw 78 may be driven by any suitable means, as for instance a beveled gear 79 mounted on the upper end of said screw and meshing with a beveled gear 80 on a shaft 81. The shaft 81 has a belt-pulley 82, driven by a belt 83 from a pulley 84 on the shaft 65.

The "sump" or catch basin 41$^a$ is provided with an inclined bottom having a trough 86 therein to catch any earth or clay which may settle down in said "sump," and this inclined bottom is provided with a feed screw 87, by means of which the earth is fed up said inclined bottom and discharged at the upper end thereof into a washing and settling tank 88, by means of which the earth is further separated from the acid and impurities. This tank 88 may be, and preferably is, similar in construction to a tank or vat 31, heretofore described, and it is not believed necessary to set forth the specific construction thereof because it will be understood from the description of tank 31. This tank 88 is provided with an over-flow 89 connected by a pipe 90, which may go to the "sump" 41$^a$ or to a sewer, and is also provided with inlet and drain pipes 88$^a$, 88$^b$, similarly to said tank 31. The conveyer 87 leading from the "sump" is provided at its upper end with a beveled gear 91, which is driven by a beveled gear 92 on the end of a shaft 93, the latter carrying a drive pulley 94 driven by a belt 95 from a pulley 96 on the shaft 44 heretofore described. The washer 88 is provided with an inclined bottom 97, along which the earth is elevated by a screw 98, said screw carrying at its upper end a beveled gear 99 driven by a beveled gear 100 on a shaft 101. On the shaft 101 is a belt-pulley 102 driven by an endless belt 103 passing over a belt-pulley 104 on one end of the shaft 48, heretofore described.

The earth from the tank 88 is discharged by the screw 98 into the trough 75, and is delivered by the screw 78 into the hopper 76, heretofore described.

The drying cylinder 77 is preferably of the rotary horizontal type, being provided with band irons 105 arranged to turn on rollers 106 in a well-known manner. On the cylinder is a girth gear 107 with which meshes a driving gear 108 on a shaft 109, the latter carrying a beveled gear 110 meshing with a bevel gear 111 on a driving shaft 112. The shaft 112 carries a belt pulley 113 driven by a belt 114, passing over a belt pulley 115 on the shaft 48. The rotary dryer is heated from a furnace 114 of any suitable type. The dryer is also provided with internal means of any well-known type (not shown) for agitating the clay or earth while being dried. The drying cylinder is provided with any suitable internal means whereby the earth is thoroughly agitated during the drying operation, so that the heating gas may reach all parts of the mass and the drying be carried out efficiently and with speed.

I will now set forth the operation of the apparatus above described, and in connection therewith will describe the method of my invention:

The clay or earth to be treated and purified is fed into the acid-treating drum 6, and the purifying chemical, for instance sulfuric acid, is fed into said drum and mixed with the earth. As the drum revolves the earth is picked up by the baffles 24, and carried upward thereby and tumbled or dropped down into the acid contained in the bottom of the drum. The speed of revolution of the drum of the size hereinbefore mentioned is preferably about eight revolutions per minute. By this step the acid is completely and thoroughly mixed throughout the body of earth as the latter is fed into the drum. During the revolution of the drum, the acid-treated earth passes slowly lengthwise of the drum toward the outlet end of the latter, being retarded in this movement by the flanges 26, so that the earth is retained in the drum long enough to be adequately treated with the acid. This treatment may be efficiently carried out in approximately ten minutes.

The acid-treated earth is discharged from the lower end of the drum into the chute 30, down which it passes into the deep portion of the washer and separating tank 31, where it is washed by the water continuously flowing into the latter. The water in the tank 31 serves to separate an amount of the impurities from the earth, thereby forming a heavy foam which consists chiefly of sulfates. The foam and water, and some particles of earth pass over the overflow 40 and down into the catch basin or "sump" 41ª, but the heavier and greater portion of the earth separates by settling to the bottom of said tank 31.

The screw 41 operates to continuously remove the settled earth from the bottom of the tank 31, and conveys it to the secondary washer 56, where the acid and impurities are washed out of the clay through the perforated sides of the washer and pass, with some particles of the earth, into the trough 72, which empties into the catch basin by the trough 73. The earth which remains in the drum passes lengthwise thereof and is discharged into trough 75 along which it is fed by the screw conveyer therein to the hopper 76 of the dryer 77.

The material or mass discharged into the "sump" or catch basin 41ª, both from the washing tank 31 and from the trough 72, as heretofore stated, may contain a quantity of earth, and this earth will settle at the bottom of the "sump" and be carried therefrom by the screw conveyer 87 to the washing and settling tank 88, where it is further washed and settled so as to recover all the clay possible and prevent waste. The clay which is settled out in the tank 88 is raised by the conveyer 98 to the trough 75, and is carried by the same to the dryer.

By the time the clay reaches the dryer it has been effectually cleansed of acid and impurities, and in the dryer the remaining moisture is driven off and the clay is ready to be used again for purifying oils.

The method above described preferably takes place continuously, and with a great saving of time over all previous methods of purification of which I am aware. When working under favorable conditions, I am able by the above apparatus and method to properly treat a given quantity of material in approximately one-half hour, whereas previous known methods have required several days and then not with as good results as is possible with my invention.

Any suitable means may be employed for continuously removing the dried earth from the drier, this means preferably consisting of an elevator or conveyer 117 driven by gear 118 connected by a belt 119 driven from a pulley 120 on the shaft 19.

The apparatus shown and described herein is made the subject matter of a divisional application filed by me June 14, 1917, Serial No. 174,694, and is claimed in said application.

What I claim and desire to secure by Letters Patent of the United States is:

1. The method of treating earth which has been used in the treatment of hydrocarbons, which consists in applying acid thereto during agitation of the earth in a chamber, continuously removing the mixture from said chamber and separating the impurities and reaction products from the earth by washing and settling, and further washing the settled and separated earth.

2. The method of treating earth which has been used in the treatment of hydrocarbons, which consists in mixing acid with the earth during agitation of the earth in a chamber, continuously flowing the mixture from said chamber, subjecting the mixture to washing and settling as it flows from the chamber and separating the settled earth from the liquids and impurities.

3. The method of treating earth which has been used in the treatment of hydrocarbons which consists in applying acid thereto during agitation of the earth in a chamber, continuously removing the mixture from the chamber and separating impurities and reaction products from the earth by washing and settling in another chamber, and further washing the settled earth while undergoing agitation in a third chamber.

4. The method of treating earth which has been used in the treatment of hydrocarbons, which consists in simultaneously and continuously admitting a body of earth and a supply of acid to a chamber, and agitating the earth by tumbling in said chamber, continuously removing the mixture of earth and acid from said chamber and separating impurities and reaction products from the earth by washing and settling, further washing the settled earth during agitation of the latter and then drying the earth while being agitated.

5. The method of treating earth which has been used in the treatment of hydrocarbons, which consists in mixing acid with the earth during agitation of the earth in a chamber, continuously flowing the mixture from said chamber during the mixing operation, subjecting the mixture to settling as it flows from the chamber, and separating the earth from liquids and impurities.

6. The method of treating earth which has been used in the treatment of hydrocarbons, which consists in mixing acid with the earth during agitation of the earth in a chamber, continuously flowing the mixture from said chamber during the mixing operation, subjecting the mixture to settling as it flows from the chamber, and continuously separating the settled earth from liquids and impurities.

7. The method of treating earth which has been used in the treatment of hydrocarbons, which consists in mixing acid with the earth during agitation of the earth in a chamber, continuously flowing the mixture from said chamber during the mixing operation, subjecting the mixture to settling as it flows from the chamber, separating the settled earth from liquids and impurities, and washing the settled earth out of contact with said liquids and impurities.

8. The method of treating earth which has been used in the treatment of hydrocarbons, which consists in mixing acid with the earth in a chamber during agitation of the earth, continuously flowing the mixture from the chamber during the mixing operation, settling the mixture as it flows from the chamber, continually removing the settled earth, washing the earth to remove the remaining reaction products and impurities, and continuously feeding the washed earth to a drying means.

9. The method of treating earth which has been used in the treatment of hydrocarbons, which consists in mixing acid with the earth in a chamber during agitation of the earth, continuously flowing the mixture from the chamber during the mixing operation, settling the mixture as it flows from the chamber, continuously removing the settled earth, washing the earth to remove the remaining reaction products and impurities, separating the washed earth from the fluid, and continuously subjecting the washed earth to drying means.

10. The method of treating earth which has been used in the filtration of hydrocarbons which consists in applying acid thereto during agitation, separating the impurities and reaction products from the earth by washing and settling, washing the earth during agitation, drying the earth, separating out any earth contained in the impurities and reaction products, and washing and drying the same.

11. The method of treating earth which has been used in the treatment of hydrocarbons, which consists in mixing acid with the earth during agitation of the earth in a chamber, continuously flowing the mixture from said chamber, subjecting the mixture to washing and settling to separate impurities and reaction products from the earth, washing the separated earth, and drying the same.

12. The method of treating earth which has been used in the filtration of hydrocarbons, which consists in mixing acid with the earth during agitation of the earth in a chamber, continuously flowing the mixture from the chamber, washing the mixture, separating liquids and impurities from the earth, and drying the earth.

In testimony whereof I have hereunto signed my name in the presence of two subscribing witnesses.

CLIFFORD M. HUSTED.

Witnesses:
  Thomas B. Hall,
  John S. A. Hosford.

It is hereby certified that in Letters Patent No. 1,256,233, granted February 12, 1918, upon the application of Clifford M. Husted, of Jersey City, New Jersey, for an improvement in "Processes for Treating Fullers' Earth and Similar Materials," an error appears in the printed specification requiring correction as follows: Page 5, line 111, claim 12, for the word "filtration" read *treatment;* and that the said Letters Patent should be read with this correction therein that the same may conform to the record of the case in the Patent Office.

Signed and sealed this 5th day of March, A. D., 1918.

[SEAL.] R. F. WHITEHEAD,

*Acting Commissioner of Patents.*

Cl. 252.